US008805073B2

(12) United States Patent
Von Berg et al.

(10) Patent No.: US 8,805,073 B2
(45) Date of Patent: Aug. 12, 2014

(54) IMAGE SEGMENTATION BY ASSIGNING CLASSES TO ADAPTIVE MESH PRIMITIVES

(75) Inventors: Jens Von Berg, Hamburg (DE); Michael Kaus, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 2628 days.

(21) Appl. No.: 10/545,656

(22) PCT Filed: Feb. 9, 2004

(86) PCT No.: PCT/IB2004/000394
§ 371 (c)(1),
(2), (4) Date: Jun. 19, 2006

(87) PCT Pub. No.: WO2004/075112
PCT Pub. Date: Sep. 2, 2004

(65) Prior Publication Data
US 2007/0041639 A1    Feb. 22, 2007

(30) Foreign Application Priority Data
Feb. 18, 2003  (EP) .................................. 03100371

(51) Int. Cl.
*G06K 9/24*    (2006.01)
(52) U.S. Cl.
USPC ........... 382/173; 382/160; 382/228; 382/219; 382/155; 382/159; 382/131; 382/20; 382/21; 382/22; 345/420; 345/421; 345/424; 345/418; 345/423

(58) Field of Classification Search
USPC ......... 345/418, 419, 619, 655, 637, 364, 420, 345/421, 424, 423; 382/173, 160, 228, 219, 382/156, 159, 131, 20, 21, 22
See application file for complete search history.

(56) References Cited

U.S. PATENT DOCUMENTS

| | | | | |
|---|---|---|---|---|
| 4,918,633 A * | 4/1990 | Sullivan | ...................... | 382/275 |
| 5,273,040 A * | 12/1993 | Apicella et al. | ............... | 600/410 |
| 5,570,430 A * | 10/1996 | Sheehan et al. | ............... | 382/128 |
| 6,078,680 A * | 6/2000 | Yoshida et al. | ............... | 382/128 |
| 6,124,864 A * | 9/2000 | Madden et al. | ............... | 345/473 |
| 6,201,543 B1 * | 3/2001 | O'Donnell et al. | ........... | 345/420 |
| 6,249,594 B1 * | 6/2001 | Hibbard | ...................... | 382/128 |
| 6,285,372 B1 * | 9/2001 | Cowsar et al. | ............... | 345/420 |
| 6,295,464 B1 * | 9/2001 | Metaxas | ...................... | 600/407 |
| 6,366,684 B1 * | 4/2002 | Gerard et al. | ................. | 382/132 |
| 6,404,920 B1 * | 6/2002 | Hsu | ...................... | 382/190 |
| 6,496,184 B1 * | 12/2002 | Freeman et al. | ............... | 345/419 |
| 7,120,276 B1 * | 10/2006 | Brady et al. | .................. | 382/107 |
| 7,466,848 B2 * | 12/2008 | Metaxas et al. | ............... | 382/128 |
| 2001/0031920 A1 * | 10/2001 | Kaufman et al. | ............. | 600/431 |
| 2002/0159627 A1 * | 10/2002 | Schneiderman et al. | ..... | 382/154 |

(Continued)

Primary Examiner — Abderrahim Merouan

(57) ABSTRACT

Quantification of metric or functional parameters often requires image segmentation. A crucial part of such method is the model of the surface characteristics of the object of interest (features), which drives the deformable surface towards the object boundary in the image. According to the present invention, sections of the mesh are assigned to different classes for different features. According to the present invention, the assignment of mesh sections to the classes is adapted by using actual feature information from the unseen image. Advantageously, this allows for an adaptation of the feature category to which the mesh section is assigned and thereby allows an improved segmentation of the object.

20 Claims, 3 Drawing Sheets

(56) References Cited

U.S. PATENT DOCUMENTS

| | | | |
|---|---|---|---|
| 2002/0167515 A1* | 11/2002 | Kamen et al. | 345/420 |
| 2003/0030636 A1* | 2/2003 | Yamaoka | 345/419 |
| 2003/0099397 A1* | 5/2003 | Matsugu et al. | 382/173 |
| 2003/0103665 A1* | 6/2003 | Uppaluri et al. | 382/131 |
| 2005/0058351 A1* | 3/2005 | Fine et al. | 382/228 |
| 2005/0129311 A1* | 6/2005 | Haynes et al. | 382/170 |

* cited by examiner

IMAGE SEGMENTATION BY ASSIGNING CLASSES TO ADAPTIVE MESH PRIMITIVES

The present invention generally relates to image segmentation. In more detail, the present invention relates to the quantification of geometric functional parameters of a selected region in a multi-dimensional dataset. In particular, the present invention relates to a method of segmenting a selected region from a multi-dimensional dataset, to a method of assigning classes to mesh primitives of an adapted mesh for segmenting an object from an image, to a method of generating a shape model for segmentation of a object from a multi-dimensional dataset, to an image processing device and to a computer program for an image processing device for assigning classes to mesh primitives of an adaptive mesh for segmenting an object from the image.

Image segmentation generally concerns selection and/or segmentation of a selected part of a dataset. Such a dataset notably represents image information of an imaged object and the selected part relates to a specific part or object of the image. The dataset is in general a multi-dimensional dataset that assigns data values to positions in a multi-dimensional geometrical space. In particular, such datasets can be two-dimensional or three-dimensional images, where the data values are pixel values, such as brightness values, gray values or color values, assigned to positions in a two-dimensional plane or a three-dimensional volume.

A selection of the selected region may be affected by an initialization of the segmentation. In particular, the initialization may be done on the basis of the shape model. Such a shape model represents the selected region in terms of a parameterization of a priori shape information. This a priori shape information and the positioning of the shape model in the multi-dimensional dataset determine the region to be selected. In particular, the shape model is an active shape model that allows for adaptation of its translation and orientation and pose, but also of shape parameters representing smaller details of the shape of the region represented by the active shape model. The adaptive mesh represents an approximate contour. Such an approximate contour represents an estimate of a boundary of the selected region with respect to the remainder of the multi-dimensional dataset. Such a contour is usually a hyper-surface in the multi-dimensional dataset, such as a surface or a curve.

The contour has a dimension which is preferably smaller than the dimensionality of the multi-dimensional dataset. During the deformation of the adaptive mesh, the approximate contour approaches the boundary of the selected region.

US 2002/0184470 A1 discloses such a method, where a shape model is set up representing the general outline of the selected region, an adaptive mesh is set up representing an approximate contour of the selected region, and wherein the adaptive mesh is initialized on the basis of the shape model and deformed in dependence on the shape model and on feature information of the selected region. In particular, the mesh adaptation is performed on the basis of optimizing a value of an energy function, wherein the energy function has an internal energy contribution, which depends on the shape model and an external energy contribution which depends on feature information of the selected region and the actual configuration of the adaptive mesh.

In this respect it has to be noted that the term "energy" is not related to physical energy, but is used because the concept of a deformable adaptive mesh shows strong resemblance to a string of masses (vertices) interconnected by springs (i.e. bonds), which move under the influence of a force field and strive towards a stable situation of minimum energy. In this resemblance, the external energy pertains to the external force field applied to the vertices and the internal energy pertains to the interaction between the vertices. In other words, the internal energy relates to a deviation of a primitive of the adaptive mesh from its original position in the shape model during the adaptation of the mesh to the selected region. The external energy relates to the deviation of this surface primitive of the adaptive mesh to the boundary of the selected region.

Such segmentation methods are used to derive, for example, models of organs or bones from the volumetric image data such as, for example, CT, MR, or US images. The geometric models are required for a variety of medical applications, or generally in the field of pattern recognition. For medical or clinical applications, an important example is cardiac diagnosis, where geometric models of the ventricles and the myocard of the heart are required for perfusion analysis, or motion analysis and computation of the ejection fraction. Another important clinical application is radiotherapy planning, where the segmentation of multiple organs and bones in, for example, the prostate region (femur heads, rectum, prostate, bladder) is necessary for the diagnosis and/or for the determination of treatment parameters. Due to the size and complexity of such large datasets, automatic tools for quantitative measurements are important for fast, accurate and reproducible analysis of such datasets in daily routine.

However, the known methods are often confound by spatially varying features around the selected region.

It is an object of the present invention to provide for an improved image segmentation.

According to an exemplary embodiment of the present invention this object may be solved with a method of segmenting a selected region from a multi-dimensional dataset, wherein an adaptive mesh comprising a plurality of mesh primitives is to be adapted to the selected region. For this, data is sampled from the multi-dimensional dataset. A probability is estimated that a mesh primitive of the plurality of mesh primitives belongs to a class of a plurality of classes by using the sample data from the multi-dimensional dataset by means of an estimator. To adapt the mesh primitive of the plurality of mesh primitives to the selected region, an energy function corresponding to the specific class of the plurality of classes is applied.

Advantageously, according to this exemplary embodiment of the present invention, a method is provided coping with the case where there is no strong agreement in the spatial extent of tissue interfaces around the organs. In other words, the method according to this exemplary embodiment copes with spatially varying features around the selected region. In addition to that, advantageously, this exemplary embodiment of the present invention provides for a rapid, accurate and robust method enabling the use thereof in a medical environment in daily routine.

According to another exemplary embodiment of the present invention as set forth in claim 2, the estimator is a Bayesian conditional estimator. This allows for a very rapid execution of the method according to the present invention with a high accuracy.

According to another exemplary embodiment of the present invention as set forth in claim 3, the plurality of classes relate to different features of the selected region, allowing for an accurate segmentation of particular features of the selected region.

Another exemplary embodiment of the present invention as set forth in claim 4 relates to a method of assigning classes to mesh primitives of an adaptive mesh for segmenting an object from an image, where a feature probe is used to assign a class to a mesh primitive. Advantageously according to this exemplary embodiment of the present invention an accurate and dependable classification with respect to features of the selected region can be made, even if there are spatially varying features around the object. According to an exemplary embodiment of this method as set forth in claim 5, an estimate is used for the classification which is a Bayesian conditional estimator.

Another exemplary embodiment of the present invention as set forth in claim 6 relates to a method of generating a shape model for segmentation of an object from a multi-dimensional dataset, which allows for an adaptive shape model. Advantageously, primitives of the adaptive mesh of the shape model are not fixedly assigned to classes related to features of the object, but the class membership of a mesh primitive may change during the adaptation, which allows for a very accurate segmentation when the shape model is used for adaptation.

According to another exemplary embodiment of the present invention as set forth in claim 7, an a posteriori probability that a feature vector belongs to a class is determined on the basis of Bayes rules. This provides for a very secure and accurate while flexible segmentation.

Claims 8 and 9 relate to image processing devices according to exemplary embodiments of the present invention, which allow for an improved segmentation.

The present invention relates also to a computer program for an image processing device for assigning classes to mesh primitives of an adaptive mesh for segmenting an object from the image. The computer program according to the present invention is defined in claim 10. The computer program according to the present invention is preferably loaded into a working memory of a data processor. The data processor is thus equipped to carry out the method of the invention. The computer program may be stored on a computer readable medium, such as a CD-Rom. The computer program may also be presented over a network such as the worldwide web and can be downloaded into the working memory of a data processor from such a network.

It may be seen as the gist of an exemplary embodiment of the present invention that an estimator is applied to assign feature classes to mesh primitives that takes the actual feature probe from the unseen image into account, calculates an a posteriori probability that the mesh primitive belongs to a given class and uses the according external energy of that class.

These and other aspects of the present invention are apparent and will be elucidated with reference to the embodiment described hereinafter and with reference to the following drawings.

Figure 1:
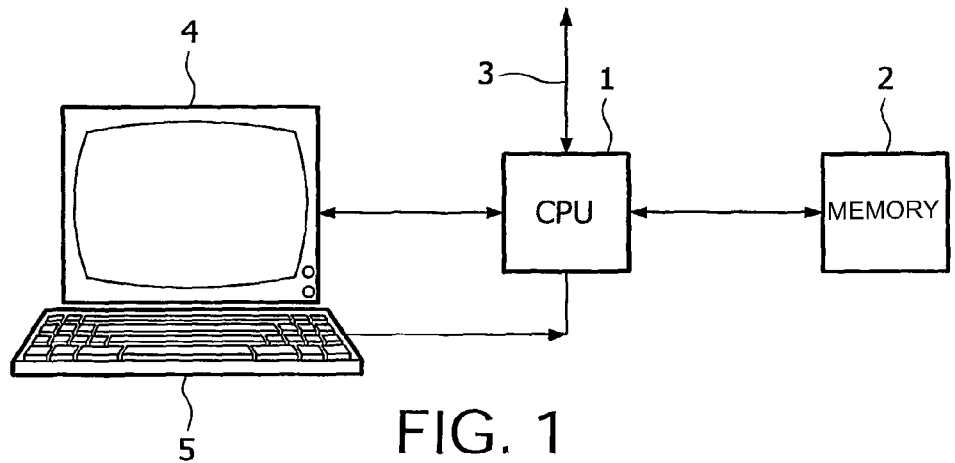
FIG. 1 shows a schematic representation of an image processing device according to an exemplary embodiment of the present invention adapted to execute a method according to an exemplary embodiment of the present invention.

FIG. 1 shows a simplified schematic representation of an embodiment of an image processing devices in accordance with the present invention. In FIG. 1 there is shown a central processing unit (CPU) or image processor 1 for adapting a deformable model surface, i.e. a surface mesh of a shape model to a selected region by mesh adaptation. The image processor 1 is connected to a memory 2 for storing multi-dimensional datasets such as, for example, images. The image processor 1 may be connected via a bus system 3 to a plurality of periphery devices or input/output devices, which are not depicted in FIG. 1. For example, the image processor 1 may be connected to a MR device, a CT device, to a plotter or a printer or the like via bus system 3. Furthermore, the image processor 1 is connected to a display such as a computer screen 4 for outputting segmentation results or information. A keyboard 5 is provided connected to the image processor 1, by which a user or operator may interact with the image processor 1 or may input data necessary or desired for segmentation.

Figure 2:
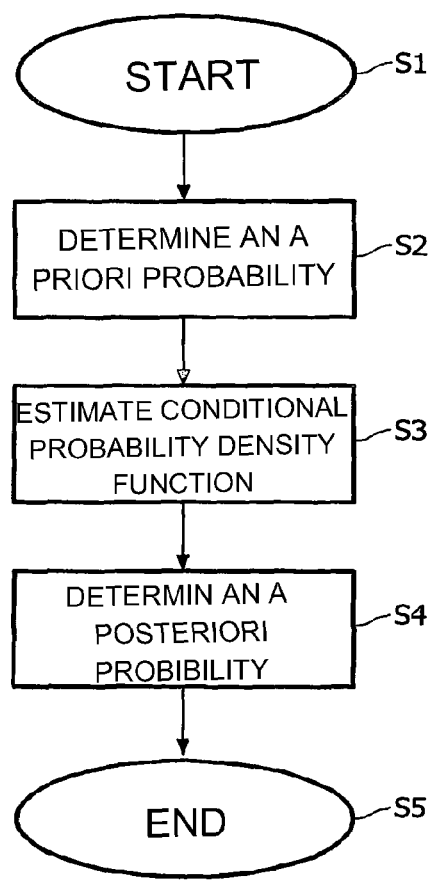
FIG. 2 shows a flow-chart of an exemplary embodiment of a method according to the present invention.
Figure 3:
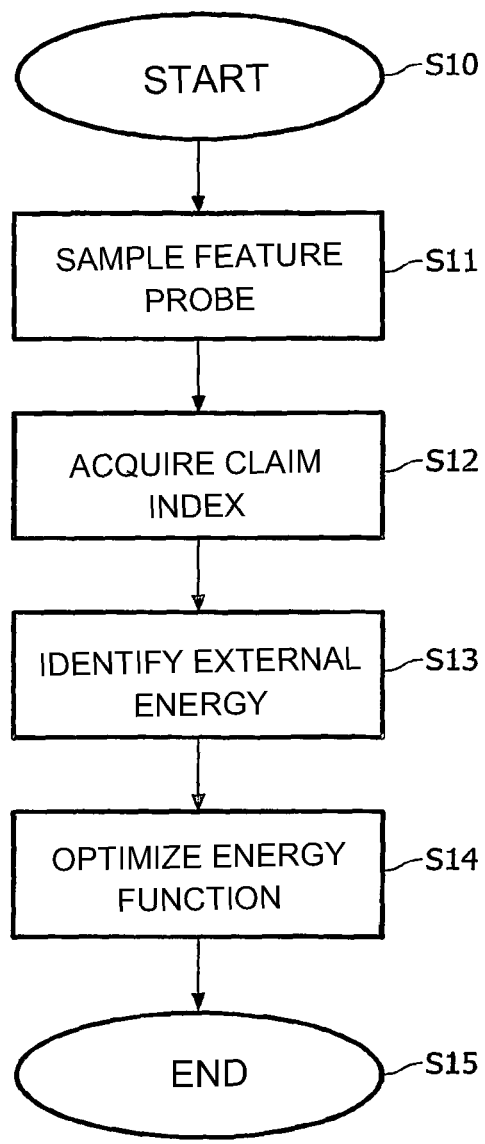
FIG. 3 shows a flow-chart of another exemplary embodiment of a method according to the present invention.

FIGS. 2 and 3 show flow-charts of exemplary embodiments of methods for operating the image processing device according to the present invention as shown in FIG. 1. FIG. 2 relates to a method for generating a shape model for segmenting an object from a multi-dimensional dataset, whereas the method depicted in FIG. 3 relates to the adaptation of the shape model for segmenting an object from an unseen image.

After the start in step S1, the method continues to step S2 where an a priori probability that a mesh primitive $P_i$ of the plurality of mesh primitives of the mesh of the shape model belongs to a class $C_j$ of a plurality of classes relating to features of the object. The a priori probability can be written as $P_i(C_j)$. $P_i(C_j)$ may, according to an exemplary embodiment of the present invention, be directly derived from a frequency of occurrence in the training set during the training, i.e. the formation of the shape model, by applying the shape model to training sets. Then, the method continues to step S3, where a class conditional probability density function is estimated for a feature vector v at a position in the multi-dimensional dataset for the plurality of classes by using data from a training model. The class conditional probability density function for a given feature vector v is estimated for each $c_j$ as $p(v|c_j)$. According to the present invention, a parametric density function such as for example a multi-dimensional Gaussian function is used to model this data from the training set. Now, training is completed and the model is built. Then, the method continues to step S4, where an a posteriori probability that the measured feature factor v at the position i is of class $C_j$ is determined. The a posteriori probability $P_i(C_j|v)$ can be determined as follows by applying the Bayes' rules as for example described in R. O. Duda et al, "Patent classification and scene analysis" John Wiley&Sons, 1973, which is hereby incorporated by reference in its entirety:

$$P_i(C_j|v) = \frac{p(v|C_j) \cdot P_i(C_j)}{p_i(v)} \qquad (1)$$

where $$p_i(v) = \sum_j p(v|C_j)P_i(C_j). \qquad (2)$$

It has to be noted that the a priori probability $P_i(C_j)$ may be expressed for the position i, while, for stating the class conditional probability density function $p(v|C_j)$ in the model, all positions are pooled. Then, an index b of the best fitting class for the feature vector v at the position i may be calculated as follows:

$$b_i(v) = \underset{j}{\operatorname{argmax}} P_i(C_j|v). \qquad (3)$$

Steps S2 to S4 may be repeated for the feature vector v at each position i and a decision may be made with respect to a best fitting class of the plurality of classes for the feature vector v at the position i on the basis of the highest a posteriori probability.

After the determination of the best fitting class for feature vector v at the position i, the method continues to step S5, where it ends.

Alternatively, discriminant functions may be used for determining the index b of the best fitting class for a given feature vector v, which separate the feature space for a given model and mesh position and allow for a quick decision on $b_i(v)$.

FIG. 3 shows a method for the adaptation of the shape model for segmenting an object from an unseen image. After the start at step S10, the method continues to step S11 where a feature probe is sampled from the unseen image. Then, the method continues to step S12 where the class index k is acquired by $k=b_i(v)$. Then, the method continues to step S13, where the external energy share $E_k(v)$ is identified, which is linked to the class identified in step S12. Then, the method continues to step S14, where the energy function $E=E_{ext}+\alpha E_{int}$ is optimized such that the primitives of the mesh of the shape model are adapted to the surface of the object. Then, the method continues to step S15.

As can be seen from the methods depicted in FIGS. 2 and 3, according to the present invention, instead of only calculating the external energy share $E_j(v)$ of the mesh primitive $P_i$ from a feature vector at the mesh position i, that was once assigned in the shape model to class j, a conditional decision process is applied, where the measured feature probe from the unseen image is incorporated into the decision process. Thus, a class membership of a mesh primitive $P_i$ may change during the adaptation and thus the local optimization goal.

Figure 4:
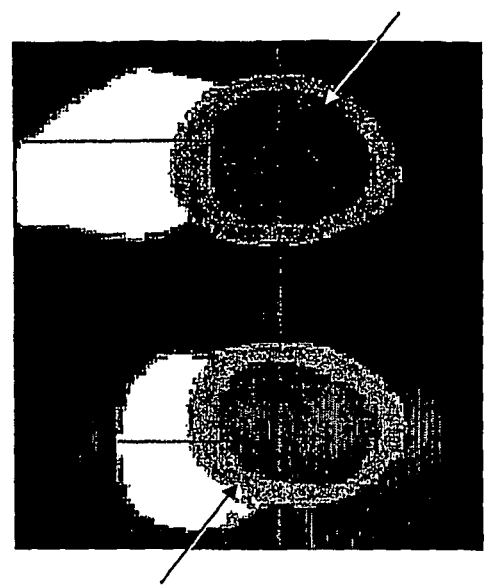
FIG. 4 shows segmentation results of a ventricle segmented according to the present invention.
Figure 5:
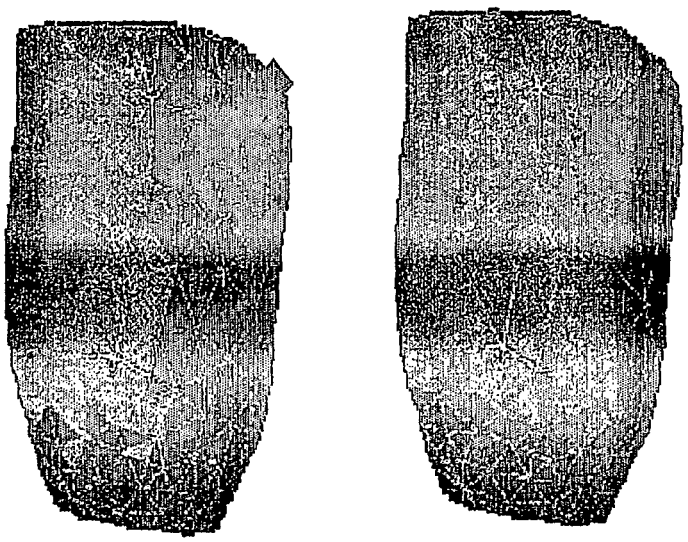
FIG. 5 shows further segmentation results of a ventricle segmented according to the present invention.

This will be further explained with reference to FIGS. 4 and 5 showing images of ventricles. The arrows in FIGS. 4 and 5 point at the same primitive of the same shape model after adaptation to different ventricles. The FIG. 4 shows slice images of the ventricles, whereas FIG. 5 shows three-dimensional representations of the ventricles. As can be taken from FIG. 4, the borders of tissue interface types of the left heart ventricle may vary between subjects and thus a position in the surface model once belongs to the interface of the lung, in FIG. 4 the upper ventricle and in FIG. 5 the left ventricle and once to the right ventricle as shown in the lower portion of FIG. 4 and on the right portion of FIG. 5. A statistical model that only represents a priori probabilities of tissue interface will always decide for the same tissue interface (namely the most likely one) at a given position. According to the adaptive conditional method described above, a feature probe from the unseen image is incorporated in the decision process and decides which tissue interface it belongs to. Thus, also tissue types of minor a priori probability can be identified if the evidence from the probe is sufficiently high.

Figure 6:
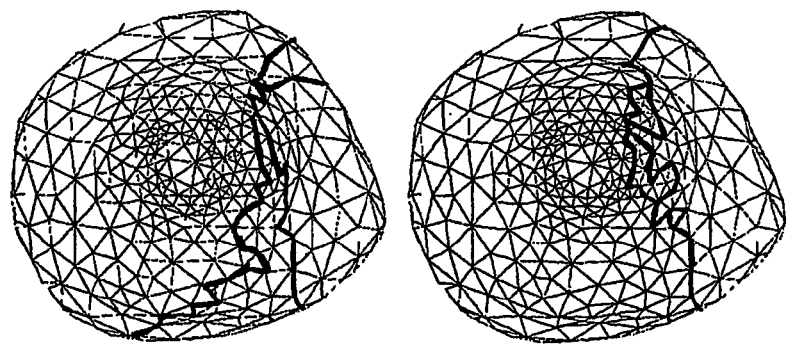
FIG. 6 shows surface measures of two individual left ventricles.

FIG. 6 shows a surface mesh of two individual ventricles viewed from the apex and flattened. The surface is separated into tissue interface classes I-r, I-l and I-f, as indicated by the bold lines in FIG. 6, indicating boundaries between the classes. In a training set of relevant heart ventricles, as shown in FIG. 6, there are three relevant tissue interface classes, namely, the interface of the right ventricle I-r, the interface to the lung I-l and the interface to epicardial fat I-f. A profile of the interface I-f may look like the I-r interface, also can be found in a position where there is usually I-i to be found and hardly any I-r. A statistical model for a given I-l dominated position on the surface, that only takes mean values of the uni-modal distribution for all subjects into account, will only be able to decide on one choice and thus may cause problems to represent that above mentioned variability in the learning set. The occurrence of epicardial fat in an unseen image at that position will therefore confound the method, although it is to be expected from the learning set to a certain a priori probability. According to the present invention, the adaptive conditional estimator is used, allowing that the actual measured feature probe can be classified by a Bayes decision theory that gives the hint at what interface class occurs in the unseen image. Therefore, according to the present invention also a class of tissue interfaces may be varyingly observed in the training set at a given mesh position, advantageously, its occurrence in an unseen image can be detected, since the measured feature probe is taken into account. Advantageously, deformable models according to the present invention using this kind of estimator according to the present invention are more flexible, robust and accurate.

Advantageously, the method according to the present invention of adaptive conditional varying surface features still finds evidence for a given class where known methods failed. It also provides a confidence measure of its decision by the a posteriori probability, which can be described with the following equation:

$$\gamma_i(v)=P_i(C_{b_i(v)}|v), \qquad (4)$$

This a posteriori probability is the probability that a feature vector v measured at the position i belongs to the best fitting class $C_{b_i(v)}$. At low confidence values no external energy may be used for the position i, or the external energy contribution may be at least reduced there.

Furthermore, it is possible to introduce a risk function as described in R. O. Duda et al, "Patent classification and scene analysis" John Wiley&Sons, 1973), which is hereby incorporated by reference in its entirety, in order to model the impact of a false decision. It may depend on the kind of application which risk function should be used. For example, in radiation therapy planning, a mis-classification leading to exposure of sensitive tissue needs a higher risk factor than other tissue classes.

The present invention is applicable to any multi-dimensional datasets, where selected regions are to be segmented. Prominent applications may also include functional diagnostics of soft tissue organs, like the heart, brain or liver from MR and CT and radiotherapy planning (bones and soft tissue from CT).

The invention claimed is:

1. A method of segmenting a selected region from a multi-dimensional dataset, via a computing device, wherein an adaptive mesh comprising a plurality of mesh primitives is to be adapted to the selected region, the method comprising the steps of:
    sampling data from the multi-dimensional dataset;
    estimating a probability, via the computing device, that a mesh primitive of the plurality of mesh primitives belongs to a class of a plurality of classes by using the sampled data from the multi-dimensional dataset by means of an estimator, wherein the probability is a function of a frequency of occurrence of the mesh primitive within a training set; and
    applying an energy function corresponding to the class of the plurality of classes, via the computing device, to adapt the mesh primitive of the plurality of mesh primitives to the selected region.

2. The method of claim 1, wherein an adaptation of the adaptive mesh to the selected region is performed on the basis of optimising a value of an energy function; wherein the energy function has an internal energy contribution that depends on a shape model representing a general outline of the selected region; wherein the energy function has an external contribution that depends on the sampled data from the multi-dimensional dataset of the selected region and an actual configuration of the adaptive mesh; wherein the shape model is updated upon deformation of the adaptive mesh; and wherein the estimator is a Bayesian conditional estimator.

3. The method of claim 1, wherein the plurality of classes relate to different features of the selected region.

4. The method of claim 1, wherein the step of sampling data from the multi-dimensional dataset includes sampling a feature probe from an unseen image.

5. The method of claim 1, wherein estimating the probability that the mesh primitive of the plurality of mesh primitives belongs to the class of the plurality of classes by using the sampled data from the multi-dimensional data set by means of the estimator further comprises the probability being a function of a calculation of a parametric density function used to model data from the training set.

6. A method of assigning classes to mesh primitives of an adaptive mesh, via a computing device, for segmenting an object from an image, the method comprising the steps of:
estimating, via a computing device, a probability that a mesh primitive of the mesh primitives belongs to a class of the classes by using a feature probe from the image by means of an estimator, wherein the probability is a function of a parametric density function used to model data from a training set; and
assigning, via a computing device, a class to the mesh primitive on the basis of the estimated probability.

7. The method of claim 6, wherein the estimator is a Bayesian conditional estimator.

8. The method of claim 6, wherein estimating the probability that the mesh primitive of the plurality of mesh primitives belongs to the class of the plurality of classes by using the sampled data from the multi-dimensional data set by means of the estimator further comprises the probability being a function of a frequency of occurrence of the mesh primitive within a training set.

9. A method of generating a shape model for segmentation of an object from a multi-dimensional dataset, via a computing device, wherein the shape model includes an adaptive mesh with a plurality of mesh primitives to be adapted to the object, the method comprising the steps of
(a) determining, via the computing device, an a priori probability that a mesh primitive of the plurality of mesh primitives belongs to a class of a plurality of classes relating to features of the object, wherein the a priori probability is derived from a frequency of occurrence of the mesh primitive within a training set;
(b) estimating, via the computing device, a class conditional probability density function for a feature vector at a position in the multi-dimensional dataset for the plurality of classes by using data from a training model;
(c) determining, via the computing device, an a posteriori probability that the feature vector belongs to the class of the plurality of classes.

10. The method of claim 9, wherein steps (a), (b) and (c) are repeated for each class of the plurality of classes and a decision is made with respect to a best fitting class of the plurality of classes for the feature vector at the position on the basis of the highest a posteriori probability, and wherein the a posteriori probability is determined on the basis of Bayes' rules.

11. The method of claim 9, wherein the feature vector is measured at a particular position.

12. The method of claim 9, further including determining a risk function indicative of an impact of a miss-classification of the mesh primitive.

13. An image processing device comprising:
a memory for storing a multi-dimensional dataset; and
a calculation unit for segmenting a selected region from the multi-dimensional dataset, wherein an adaptive mesh comprising a plurality of mesh primitives is to be adapted to the selected region, the calculation unit being constructed to sample data from the multi-dimensional dataset; estimate a probability that a mesh primitive of the plurality of mesh primitives belongs to a class of a plurality of classes by using the sampled data from the multi-dimensional dataset by means of an estimator, wherein the probability is derived from a frequency of occurrence of the mesh primitive within a training set; and apply an energy function corresponding to the class of the plurality of classes to adapt the mesh primitive of the plurality of mesh primitives to the selected region.

14. The processing device of claim 13, wherein estimating the probability that the mesh primitive of the plurality of mesh primitives belongs to the class of the plurality of classes by using the sampled data from the multi-dimensional data set by means of the estimator further comprises the probability being a function of a calculation of a parametric density function used to model data from the training set.

15. The image processing device of claim 13, wherein the calculation unit optimizes the energy function so that the mesh primitive adapts to a surface of the selected region.

16. The image processing device of claim 13, wherein the calculation unit determines an index for the class index and identify the energy function based on the index.

17. The image processing device of claim 16, wherein the calculation unit uses a discriminant function to determine the index.

18. The image processing device of claim 17, wherein estimating the probability that the mesh primitive of the plurality of mesh primitives belongs to the class of the plurality of classes by using the sampled data from the multi-dimensional data set by means of the estimator further comprises the probability being a function of a frequency of occurrence of the mesh primitive within a training set.

19. An image processing device comprising:
a memory for storing an image;
a calculation unit for: assigning classes to mesh primitives of an adaptive mesh for segmenting an object from the image; estimating a probability that a mesh primitive of the mesh primitives belongs to a class of the classes by using a feature probe from the image by means of an estimator, wherein the probability is derived from a calculation of a parametric density function used to model data from a training set; and assigning a class to the mesh primitive on the basis of the estimated probability.

20. A computer readable storage medium encoded with computer executable instructions for an image processing device for assigning classes to mesh primitives of an adaptive mesh for segmenting an object from the image, the computer executable instructions, when executed by a processor cause the process to perform the following steps:
estimating a probability that a mesh primitive of the mesh primitives belongs to a class of the classes by using a feature probe from the image by means of an estimator, wherein the probability is derived from both a frequency of occurrence of the mesh primitive within a training set and a calculation of a parametric density function used to model data from the training set; and
assigning a class to the mesh primitive on the basis of the estimated probability.

* * * * *